Patented Oct. 9, 1928.

1,687,270

UNITED STATES PATENT OFFICE.

ALBERT K. EPSTEIN, OF CHICAGO, ILLINOIS.

EGG PRODUCT AND PROCESS FOR PRODUCING THE SAME.

No Drawing.  Application filed December 24, 1926. Serial No. 156,998.

My invention relates to egg products and process for producing the same, being directed more particularly to an egg yolk product, an object being to provide such a product having different desirable characteristics than that heretofore produced and certain features and advantages. More particularly, my invention is directed to an egg yolk product of the character ordinarily frozen and shipped to the consumer where it is thawed out before incorporating with other ingredients for its final use.

Generally speaking, the present invention is directed to the production of such a frozen product in which normal commercial egg yolk, or egg yolk and a suitable edible acid such as acetic acid or its equivalent, capable of reducing bacteria and other micro-organisms therein to an extent to prevent putrefaction and other bacteria decomposition in liquid state, is further treated or combined with sucrose or any other suitable substantially neutral water soluble edible organic compound containing at least one hydroxyl group capable of lowering the freezing point of water, and a suitable substantially neutral edible salt system such as common salt or its equivalent, so as to substantially modify the final normal viscosity and mobility of the product, that is those latter characteristics thereof after it is frozen and thawed, to a desirable degree; and to give it other desirable characteristics. Or in another sense, I may use (1) yolk material and a substantial quantity of sucrose or its equivalent as referred to above, or (2) yolk, sucrose and acid, and treat either combination further with a substantial quantity of a suitable substantially neutral edible salt system such as common salt or its equivalent, so as to substantially modify the final normal viscosity and mobility of the product, that is those latter characteristics thereof after it is frozen and thawed, to a desirable degree; and to give it other desirable characteristics.

In the treatment of the commercial egg yolk I take a suitable amount, that is an amount which may be conveniently handled in the mixing machine. This yolk is produced by separating the yolk from the white, and although in such separation a small amount of the white may adhere to the yolk it is not detrimental to the final product.

As to the acid ingredient incorporated, I preferably use an edible one which is capable of reducing bacteria and other micro-organisms and in such proportion as to substantially prevent putrefaction and other bacterial decomposition of the yolk in liquid state. To this end I have found that various acids may be used such as acetic and others of an equivalent character, such as citric, phosphoric, tartaric, lactic, malic or succinic.

This treatment of egg substance with acid is pointed out more particularly and claimed in my application Serial No. 156,995, filed of even date herewith.

With reference to the salt system I preferably use common table salt, or in other words sodium chloride, although I contemplate using other neutral salt systems such as an alkaline sodium phosphate $$(Na_2HPO_4 12H_2O)$$

treated with sufficient acid sodium phosphate $(NaH_2PO_4)$ to give a substantially neutral phosphate mixture. Or tri-sodium citrate (which is slightly alkaline) treated with sufficient citric acid or some other edible acid to render the sodium citrate neutral.

I also find that I may use another substantially neutral edible salt system in the form of tri-sodium phosphate $(Na_3PO_4)$ which is strongly alkaline, and treat it with sufficient phosphoric acid, which is strongly acid, to give a substantially neutral phosphate salt system.

This salt treatment is more particularly pointed out and claimed in my application Serial No. 156,996, filed of even date herewith.

When a neutral salt system such as sodium chloride is added to yolk substance in appreciable quantities in the presence of a water soluble organic compound containing one or more hydroxyl groups such as glycerine, cane sugar or their equivalents, or to an acid yolk containing a water soluble organic compound containing hydroxyl group, it has a tendency to increase the viscosity after freezing and thawing. This tendency of increasing the viscosity is due to the fact that the salt system such as sodium chloride and its equivalent is an electrolyte and alters the electrical charge upon the protein material and it is ionizable and produces a greater osmotic pressure and effects the physical properties of the protein material of the yolk substance after freezing and thawing in the presence of a water soluble organic compound containing one or more hydroxyl groups so as to alter the viscosity and other properties of the product after freezing and thawing, in a manner entirely different than if the yolk substance would not contain the organic water soluble compound containing hydroxyl groups. Thus I found that when a portion of the water soluble organic compound containing hydroxyl group such as cane sugar or glycerine is replaced with an equal proportion of a neutral salt system such as sodium chloride, an entirely new result is obtained which is different than when the same quantities of organic water soluble substance containing hydroxyl groups such as glycerine, cane sugar or their equivalents are used alone, or an equal quantity of salt alone is used with the acid treated yolk.

Thus I found that if in place of adding ten per cent of sugar, or its equivalent, to yolk substance alone, or to acid treated yolk (yolk substance containing acetic acid or equivalent acid in sufficient quantity to prevent bacterial decomposition), I add only five percent of sugar and replace the other five per cent with a neutral salt system such as sodium chloride I obtain an ultimate product (after freezing and thawing) in terms of viscosity and other properties which is entirely different than if ten per cent of salt alone or sugar alone were added to the yolk substance or acid treated yolk substance. Thus the various ingredients (yolk, acid, sugar) in the mixture act differently in the presence of a neutral salt than if the salt were not there. Thus substantial quantities of sodium chloride change the action of the acid and sugar upon the yolk substance so as to give a different ultimate product, that is, the product after freezing and thawing.

Minute amounts of neutral salt will not accomplish this result in yolk substance. A substantial quantity of salt must be used in order to produce the desired result. I have found in practice that when I use four and six-tenths (4.6) pounds of neutral salt or its equivalent and four and six-tenths (4.6) pounds of cane sugar or its equivalent and eight-tenths (.8) per cent acid and ninety (90) pounds yolk substance in this mixture, and freeze and thaw the mixture, I obtain the desired consistency. I do not limit myself to the above quantities of salt or sugar or acid. Any substantial amount of salt which will increase to a desirable extent the viscosity of the ultimate product, consisting of yolk substance, or acid treated yolk substance containing a water soluble organic compound containing hydroxyl group, such as glycerine, sucrose, lactose, or the like, is considered within the scope of my invention.

In treating the yolk alone with substantial additions of a suitable salt system and glycerine or sucrose or their equivalent, to secure the desired consistency of the ultimate product, I preferably employ approximately ninety (90) pounds of yolk, five (5) pounds of sucrose and five (5) pounds of sodium chloride thoroughly mixed and frozen to a solid mass. Other ingredients may be added before freezing, such as mustard oil or other condimental or flavoring substances, depending upon the use to which the final product is to be put.

As already pointed out, the said ingredients or substances with which the yolk is treated may be varied to get different desired consistencies or viscosities and other desirable characteristics. For instance, ordinary fresh yolk after freezing and thawing, that is untreated yolk, is very firm and the viscosity is very high. However, if the fresh yolk is treated with ten per cent by weight of sucrose and is frozen and thawed, it has less viscosity than if treated with five per cent sucrose and five per cent of a said salt system. Or in other words, using five per cent sucrose and five per cent salt gives a greater viscosity than if ten per cent of sugar only is used. When I speak of viscosity I means the viscosity of the final mixture after being frozen and thawed. Thus, if sugar alone is used the viscosity is less than if a proportion of the whole equal to the sum of the two ingredients were used. Practically the same results would be secured as to viscosity of the final product when thawed after being frozen, if the yolk were treated with one of the said acids in addition to the salt and sugar, or with the sugar alone, in proportions as stated above.

Then again, if for example ten per cent of salt alone was mixed with the yolk, whether the fresh yolk or acid treated yolk, the viscosity of the mixture when thawed after freezing is greater than if a ten per cent mixture of sugar and salt were added. Or taking the reverse, a ten per cent addition of sugar and salt will give an ultimate product having a viscosity which is substantially less than if a ten per cent addition of salt alone were used.

Thus in the preferred form of my invention I employ substantial proportions of sucrose and the desired salt system, whether added to the yolk alone, or the acid treated yolk, in a quantity sufficient to produce a viscosity of the ultimate mixture when thawed after being frozen which is substantially greater than that of an ultimate product when thawed after being frozen consisting of yolk combined with the sucrose alone in a proportion equal to the sum of the two ingredients, and is substantially less viscous than if salt alone were used in a proportion equal to the sum of both the sucrose and salt.

In adding the ingredients to the yolk substance, I may add them in their natural state, or first mix them with each other, or wet them so that they may be more readily incorporated with the yolk.

In giving the above examples I have pointed out what are most desirable commercial products, but it is to be understood that the proportions may be varied to some extent. For instance, I find that for the acid treatment the use of one-half to one and one-half per cent by weight of the ultimate product gives most suitable results. As to the combined salt and sugar proportion as given above, ten per cent of the ultimate product is preferably incorporated, but this may be varied depending to a great extent upon the flavor, viscosity and fluidity or mobility desired.

What I claim as new and desire to secure by United States Letters Patent is:—

1. As a new article of manufacture, a frozen product including, essentially egg yolk combined with a substantial quantity of a suitable substantially neutral edible water soluble organic material containing at least one hydroxyl group and capable of lowering the freezing point of water, and a substantial quantity of a suitable edible substantially neutral salt system, the combined proportion of the latter two substances being in sufficient quantity to produce a viscosity of the ultimate mixture when thawed after being frozen which is substantially greater than that of an ultimate product when thawed after being frozen consisting of yolk combined with such soluble organic material if used alone in a proportion equal to the said sum of the soluble organic material and the salt system.

2. As a new article of manufacture, a frozen product including, essentially egg yolk combined with a substantial quantity of a suitable substantially neutral edible water soluble organic material containing at least one hydroxyl group and capable of lowering the freezing point of water, and a substantial quantity of a suitable edible substantially neutral salt system, both latter substances being in sufficient quantity to modify the physical consistency of the ultimate product when thawed after being frozen to produce a viscosity thereof substantially less than that of yolk alone when thawed after being frozen.

3. As a new article of manufacture, a frozen product including, essentially egg yolk combined with a suitable edible acid capable of and in sufficient quantity for reducing bacterial decomposition of the yolk substance, a substantial quantity of edible water soluble organic material containing at least one hydroxyl group and capable of lowering the freezing point of water, and a substantial quantity of an edible neutral salt system, the combined proportion of the latter two substances being in sufficient quantity to produce a viscosity of the ultimate product thawed after being frozen which is substantially greater than that of an ultimate product thawed after being frozen consisting of acid treated yolk combined with such soluble organic material if used alone in a proportion equal to the said sum of the soluble organic material and the salt system.

4. As a new article of manufacture, a frozen product including, essentially egg yolk combined with a suitable edible acid capable of and in sufficient quantity for reducing bacterial decomposition of the yolk substance, a substantial quantity of edible water soluble organic material containing at least one hydroxyl group and capable of lowering the freezing point of water, and a substantial quantity of an edible neutral salt system, both latter substances being in sufficient quantity to modify the physical consistency of the ultimate product when thawed after being frozen to produce a viscosity thereof substantially less than that of acid treated yolk alone when thawed after being frozen.

5. As a new article of manufacture, a frozen product including essentially egg yolk material combined with sucrose and sodium chloride in sufficient quantity to substantially modify the physical consistency and produce an ultimate product when thawed after being frozen which has a viscosity substantially less than yoke alone thawed after being frozen.

6. As a new article of manufacture, a frozen product including essentially egg yolk material treated with a suitable edible acid capable of and in sufficient proportion to reduce bacterial decomposition of the yolk substance, combined with sucrose and sodium chloride in sufficient quantity to substantially modify the physical consistency and produce an ultimate product when thawed after being frozen which has a viscosity substantially less than the acid treated yolk thawed after being frozen.

7. The new method of producing an egg product consisting of treating egg yolk with a substantial quantity of a suitable substantially neutral edible water soluble organic material containing at least one hydroxyl group and capable of lowering the freezing point of water, and a substantial quantity of a suitable edible substantially neutral salt system, the combined proportion of the latter two substances being in sufficient quantity to produce a viscosity of the ultimate mixture when thawed after being frozen which is substantially greater than that of an ultimate product when thawed after being frozen consisting of yolk combined with such soluble organic material if used alone in a proportion equal to the said sum of the soluble organic material and the salt system, and freezing the mixture.

8. The method of producing an egg product consisting of treating egg yolk with a substantial quantity of a suitable substantially neutral edible water soluble organic material containing at least one hydroxyl group and capable of lowering the freezing point of water, and a substantial quantity of a suitable edible substantially neutral salt system, both latter substances being in sufficient quantity to modify the physical consistency of the ultimate product when thawed after being frozen to produce a viscosity thereof substantially less than that of yolk alone when thawed after being frozen and freezing the mixture.

9. The method of producing an egg product consisting of treating egg yolk with a suitable edible acid capable of and in sufficient quantity to reduce bacterial decomposition of the yolk substance, and with a substantial quantity of sugar material, and with a substantial quantity of sodium chloride, the combined proportion of the latter two substances being in sufficient quantity to produce a viscosity of the ultimate product thawed after being frozen which is substantially greater than that of an ultimate product thawed after being frozen consisting of acid treated yolk combined with such soluble organic material if used alone in a proportion equal to the said sum of the soluble organic material and the salt system, and freezing the mixture.

10. The method of producing an egg product consisting of treating egg yolk with a suitable edible acid capable of and in sufficient quantity to reduce bacterial decomposition of the yolk substance, and with a substantial quantity of an edible water soluble organic material containing at least one hydroxyl group and capable of lowering the freezing point of water, and with a substantial quantity of an edible neutral salt system, both latter substances being in sufficient quantity to modify the physical consistency of the ultimate product when thawed after being frozen to produce a viscosity thereof substantially less than that of acid treated yolk alone when thawed after being frozen, and freezing the mixture.

11. As a new article of manufacture, a frozen product including, essentially egg yolk, sugar material and sodium chloride in proportions approximating ninety parts, five parts and five parts by weight respectively.

12. As a new article of manufacture, a frozen product including, essentially egg yolk, acetic acid, sugar material and sodium chloride, in proportions approximating ninety parts, eight-tenths (.8) part, four and six-tenths (4.6) part and four and six-tenths (4.6) parts by weight respectively.

13. As a new article of manufacture, a soft product, preliminarily frozen and including, essentially egg yolk combined with a substantial quantity of a suitable substantially neutral edible water soluble organic material containing at least one hydroxyl group and capable of lowering the freezing point of water, and a substantial quantity of sodium chloride, both latter substances being in sufficient quantity to modify the physical consistency of the ultimate product when thawed after being frozen to produce a viscosity thereof substantially less than that of yolk alone when thawed after being frozen.

14. As a new article of manufacture, a soft product preliminarily frozen and including, essentially egg yolk combined with a suitable edible acid capable of and in sufficient quantity to reduce bacterial decomposition of the yolk substance, a substantial quantity of edible water soluble organic material containing at least one hydroxyl group and capable of lowering the freezing point of water, and a substantial quantity of an edible neutral salt system, both latter substances being in sufficient quantity to modify the physical consistency of the ultimate product when thawed after being frozen to produce viscosity thereof substantially less than that of acid treated yolk alone when thawed after being frozen.

In witness whereof, I hereunto subscribe my name this 18th day of December, 1926.

ALBERT K. EPSTEIN.